Aug. 11, 1970  R. G. BUSER ET AL  3,524,144
LASER GENERATOR HAVING A SHOCK-INDUCED
NARROW BAND ILLUMINATOR
Filed July 13, 1965  2 Sheets-Sheet 1
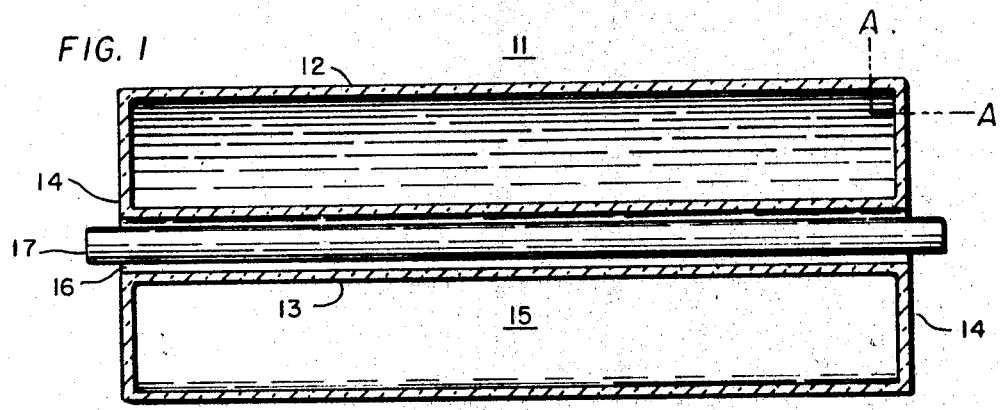
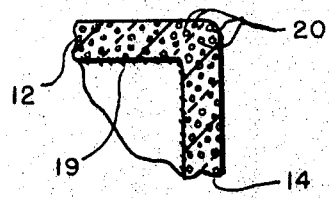
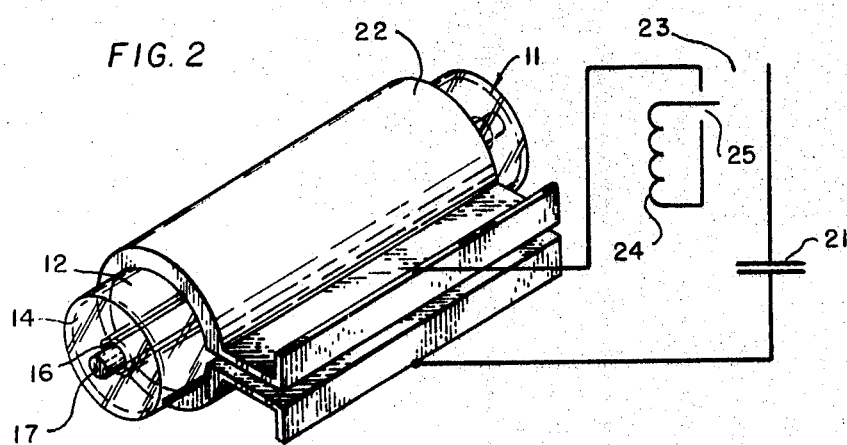
INVENTORS,
RUDOLF G. BUSER
JOHANN J. KAINZ
JOHN J. SULLIVAN.
BY
HARRY M. SARAGOVITZ,
ATTORNEY.

INVENTORS,
RUDOLF G. BUSER
JOHANN J. KAINZ
JOHN J. SULLIVAN.

BY

HARRY M. SARAGOVITZ,

ATTORNEY.

3,524,144
LASER GENERATOR HAVING A SHOCK-INDUCED NARROW BAND ILLUMINATOR
Rudolf G. Buser, Manasquan, Johann J. Kainz, Allenhurst, and John J. Sullivan, Neptune, N.J., assignors to the United States of America as represented by the Secretary of the Army
Filed July 13, 1965, Ser. No. 471,776
H01s 3/09
U.S. Cl. 331—94.5                    4 Claims

ABSTRACT OF THE DISCLOSURE

A relatively narrow band light source for illuminating laser mediums includes a sealed glass envelope forming a chamber which surrounds a major portion of the laser medium. An ionizable gas is contained in the chamber which includes a transparent wall adjacent the laser medium. Also, included in the chamber is an impurity gas containing a substantial number of atoms capable of being excited to higher energy states and capable of emitting light in a narrow band which matches the absorption band of the laser medium. The interior surfaces of the chamber wall carry atoms which will emit light in this narrow band when boiled off by shock waves induced in the chamber by magnetic fields. The magnetic field is produced by coils surrounding the chamber.

---

Figure 3:
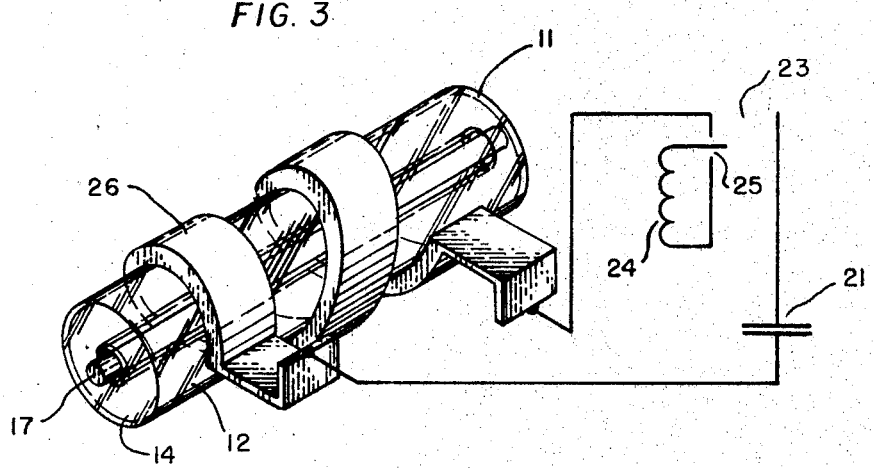

The invention described herein may be manufactured and used by or for the Government for governmental purposes without the payment of any royalty thereon.

The present invention relates to illuminators and more particularly to a relatively narrow band light source for illuminating laser mediums.

In the field of lasers, it has been the general practice to employ high pressure (above 300 mm. Hg) noble gas flashlamps as light sources for illuminating the laser mediums. The overall efficiency of such devices as expressed in coherent energy output per input electrical energy in the flashlamps is a function of many parameters including the spectral characteristics of the flashlamp. The spectral characteristics in turn depend on the composition and pressure of the noble gas. Since the spectrum of noble gas flashlamps are relatively continuous over the light region of the radiation spectrum, lasers employing such devices are characterized by a relatively poor optical match between the broadband flash and the narrow absorption bands of the laser medium. That portion of the radiated energy from the flashlamp which does not match the absorption bands of the laser medium is partially absorbed by the medium in the form of heat thereby limiting the repetition rate of the pump pulses. The pump repetition rate of present devices is further reduced by the geometry of such devices which present a relatively high inductance to the energy source.

Therefore, those concerned with the development of laser pumping devices have recognized the need for an efficient low pressure illuminating means which can be pulsed at a substantially high rate from high power sources. The present invention is an illuminating device which fulfills this need.

It is therefore an object of the present invention to provide a low pressure illuminating means which radiates in relatively narrow bands.

Another object of the present invention is the provision of a laser device which has good optical matching characteristics.

Another object is to provide a laser illuminating device which does not substantially heat up the laser medium.

A further object of the invention is the provision of a laser device which is relatively inexpensive.

Still another object is to provide a laser pumping device which is not bulky or complex and can be easily manufactured with a relatively few number of parts.

Yet another object is to provide a laser device which is capable of high pulse repetition rates.

Other advantages and many of the attendant advantages of this invention will be readily appreciated as the same becomes better understood by reference to the following detailed description when considered in connection with the accompanying drawings in which like reference numerals designate like parts throughout the figures thereof, and wherein—

FIG. 1 represents a longitudinal cross-section of the device,

FIG. 1–A is an enlarged section of a portion of the device taken on the line A—A of FIG. 1, and FIGS. 2–4 show isometric views of three forms of the invention.

Referring now to the drawings, wherein like reference characters designate like or corresponding parts throughout the several views, there is shown in FIG. 1 a hermetically sealed glass envelope 11 having an outer cylindrical glass wall 12, an inner cylindrical glass wall 13, and glass ring-shaped end walls 14 to form a chamber 15 and a central opening 16. The chamber 15 is filled to pressures less than 10 mm. Hg. with an ionizable gas. A laser medium 17 such as a ruby rod is placed in opening 16. Either liquid of gaseous laser mediums may also be used in place of the solid state medium 17 which is merely shown for purposes of illustration. The laser material 17 may have the usual reflecting surfaces applied to the end faces thereof or an optical system having mirrors, apertures, lenses, etc. may be mounted relative to medium 17 in any other well-known manner to obtain a desired output.

Illumination of the laser medium 17 is accomplished by producing high pressure shock waves in the gas contained in chamber 15. These shock waves will compress and heat the gas causing excitation and ionization of the atoms, excitation of ions, and production of higher ionized states, which atoms or ions will then give off large amounts of radiation as they return to their equilibrium states. The shock waves are produced in the gas by establishing a large electric field in chamber 15 which will ionize the gas adjacent the outer wall 12 thereby inducing a current in chamber 15. This induced current will be in the form of a sheet near wall 12. The large electric field may be produced by applying a large rapidly changing magnetic field to chamber 15. The induced current in chamber 15 will then interact with this magnetic field, which is perpendicular thereto, to produce an inwardly directed radial force on the gas. This force and heating of the gas due to the currents will produce the high pressure shock waves which will travel from the outer wall 12 inwardly to the inner wall 13 where they will collide with the inner surface of the inner wall 13. During this collision the plasma adjacent the inner wall 13 may be excited even further thereby causing radiation of equal importance. After colliding with the inner wall 13 the shock wave will be reflected outwardly and then into collision with the outer wall 12. These reflections will continue until the energy in the wave has been dissipated. The number of reflections will, of course, depend on the pressure and composition of the gas, the amount of energy used to create the shock wave, the size, shape, and composition of the envelope 11, etc. Axial shock waves traveling between walls 14 may also be produced depending on the geometry of the device, the shape of the magnetic and electric field, etc. Although there will be some broadband radiation given off as a result of heating the gas and the glass envelope 11, the substantial amount of the total radiation from chamber 15 will be contained in comparatively narrow bands as a result of the excited atoms in the plasma returning to their equilibrium state. Of course, the location of these narrow bands in the spectrum will depend on the line spectrum of the atoms contained in the chamber 15. Therefore, to obtain good optical matching, the gas contained in the chamber 15, besides having good characteristics for establishing and supporting high pressure shock waves, should also contain a substantial number of atoms whose line spectrum match that of the absorption bands of the laser medium. Since the shock waves collide with the walls of the envelope 11 with a large amount of energy, and as a result evaporate atoms from the walls, solid state materials having suitable line spectrum may be impregnated or coated on the walls as shown in FIG. 1-A. Therefore, when the shock wave collides with the coated walls, some of the atoms of coating 19 will be boiled off, excited, and radiated. The coating 19 should, of course, be transparent to permit the radiation to pass through wall 13.

It is also pointed out that the magnetic field which produces the shock waves will also broaden out the absorption bands of the laser medium 17 because of the Zeeman effect, thereby, enhancing even further the optical match between the gas and the laser 17. Of course, the output of the laser need not be affected by the Zeeman effect since the laser can be made to radiate between pulses, i.e., when the magnetic field is zero and the bands of the laser are again narrow. Therefore, the bands of the laser medium will be broadened while the gas in envelope 11 is radiating and will be narrow while the laser medium 17 is radiating. In fact, the laser medium is capable of absorbing more energy while its bands are broadened, i.e., the laser can absorb energy in bands which are actually forbidden energy bands. Therefore, when the magnetic field is removed or is passing through zero this over abundance of absorbed energy in the laser will be released as radiation and thereby stimulate further radiation from the laser. The output of the laser will, therefore, by synchronized with the input in that the laser will be triggered as the magnetic field approaches zero.

The outer wall 12 and end walls 14 may be provided with reflecting means of nonconducting material for reflecting the radiated light back to the laser medium 17 to increase the efficiency of the device. Therefore, walls 12 and 14 may be treated during manufacture, for example, to form the air bubbles 20. This type of glass is commonly known as "satin" glass and has good reflective qualities. Other forms of nonconducting reflectors such as a ceramic coating may also be used.

Figure 4:
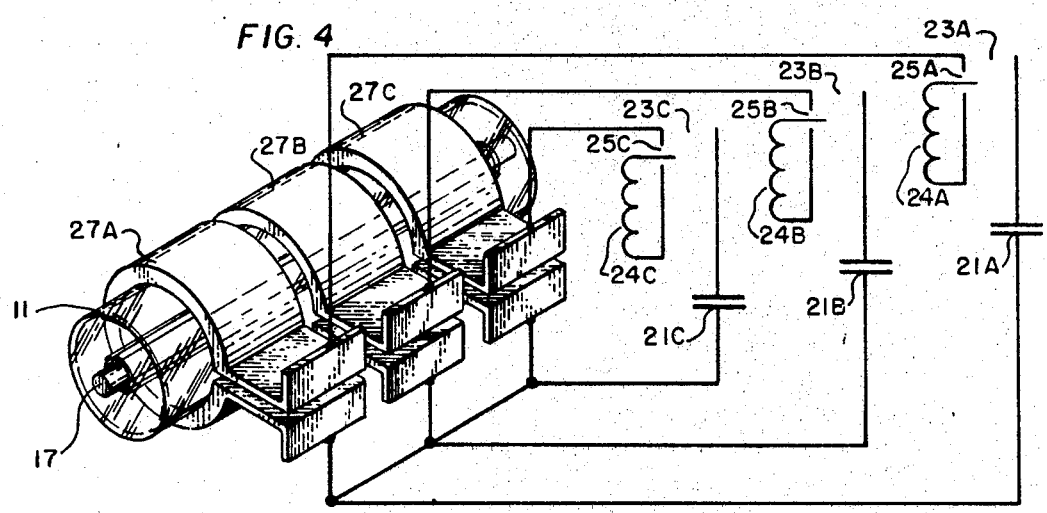

FIGS. 2, 3, and 4 show three methods of producing shock waves in chamber 15. All three devices discharge a high voltage condenser 21 through a coil surrounding envelope 11. The device of FIG. 2 shows a single-loop omega coil 22 connected across condenser 21 through a spark gap 23. Ionization of spark gap 23 is effected by inducing a trigger pulse in secondary coil 24 by a primary (not shown) which ionizes a second spark gap 25. Ionization of gap 25 will lower the resistance of gap 23, thereby permitting the voltage on condenser 21 to break down gap 23 and produce a high current pulse through coil 22. Coil 22 will produce a rapidly changing longitudinal magnetic field which induces in the chamber 15 a high electric field. This electric field will then break down the gas in chamber 15 and induce an intense current in the form of a sheet near the wall 12. Since this induced current in chamber 15 is perpendicular to the magnetic field produced by coil 22 a perpendicular force directed toward wall 13 will be produced on the gas near the outer wall 12. This force and/or the heating of the gas near the outer wall 12 by the currents will cause the aforementioned shock waves in the gas. The shock wave will continue to travel toward wall 13 even after the induced force is removed. In fact, while one shock wave is traveling toward wall 13, another shock wave may be initiated by discharging a second pulse of current through coil 22. This feature is desirable if one wishes to continuously illuminate the laser medium 17 by producing a rapid series of shock waves. The device shown in FIG. 2 has a disadvantage in that the inductance of coil 22 is relatively low compared to a device using a coil of several turns. It may therefore be difficult to obtain good matching between coil 22 and the high voltage capacitor 21.

FIG. 3 shows a device having a multiple turn coil 26 which may have a high inductance and therefore good matching and efficient energy transfer. Although such a device has higher efficiency characteristics, the high inductance may limit the pulse repetition rate and the rate of change of flux.

The device of FIG. 4 shows three single loop omega coils 27A, 27B, and 27C, connected across condensers 21A, 21B, and 21C respectively. Because the coils 27A, 27B, and 27C may be made axially smaller than coil 22 of FIG. 2 and still substantially cover the entire envelope 11, both good matching and a higher repetition rate may be realized. Of course, the device of FIG. 4 would be more expensive than the devices of FIGS. 2 and 3. It is understood that the coils 24A, 24B, and 24C may all be coupled to a common primary coil (not shown).

Obviously many modifications and variations of the present invention are possible in the light of the above teachings. For example, preionization electrodes may be mounted in the walls 14 and these electrodes may be connected in series with gap 23. It is therefore to be understood, that within the scope of the appended claims, the invention may be practiced otherwise than as specifically described.

What is claimed is:

1. A laser generator comprising a laserable medium contained within a resonant cavity the absorption spectrum of said medium containing relatively narrow frequency bands, illuminating means for pumping said medium at the frequencies of said narrow frequency bands, said illuminating means including a sealed chamber surrounding a major portion of said laserable medium, said chamber walls adjacent said laserable medium being transparent to said pumping frequencies, said chamber containing an ionizable gas, a portion of the walls of said chamber containing atoms having an emission spectrum when excited to higher energy states, said emission spectrum having substantially all of the energy therein contained in relatively narrow frequency bands which match said absorption spectrum of said medium, and means for inducing shock waves in said gas which collide with said walls with sufficient energy to cause said atoms to be excited to said higher energy states.

2. The device according to claim 1 and further including nonconductive reflective means surrounding said chamber for reflecting light towards said laser medium.

3. The device according to claim 2 and wherein said means for inducing shock waves comprises a single loop coil surrounding a substantial portion of said chamber and connected across a high voltage condenser through a switch.

4. The device according to claim 2 and wherein said means for inducing shock waves comprises a plurality of axially spaced single loop coils surrounding said chamber and covering a substantial portion thereof, each said coil being connected across a separate high voltage condenser through a switch means.

References Cited

UNITED STATES PATENTS

| 3,258,716 | 6/1966 | Nassau et al. | 331—94.5 |
| 3,235,816 | 2/1966 | Wanlass | 331—94.5 |
| 3,387,227 | 6/1968 | Mastrup et al. | 331—94.5 |
| 3,209,281 | 9/1965 | Colgate et al. | 331—94.5 |

RONALD L. WIBERT, Primary Examiner

T. MAJOR, Assistant Examiner